Feb. 28, 1967    G. M. PARSONS    3,307,051
ENERGIZING SYSTEM
Filed May 15, 1964    2 Sheets-Sheet 1
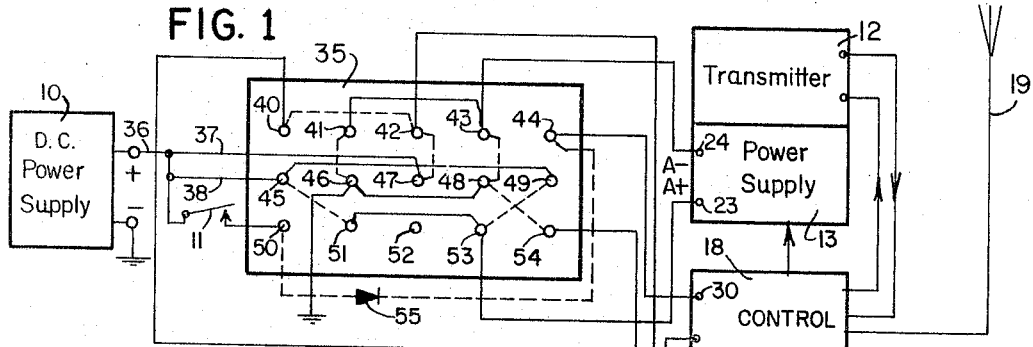
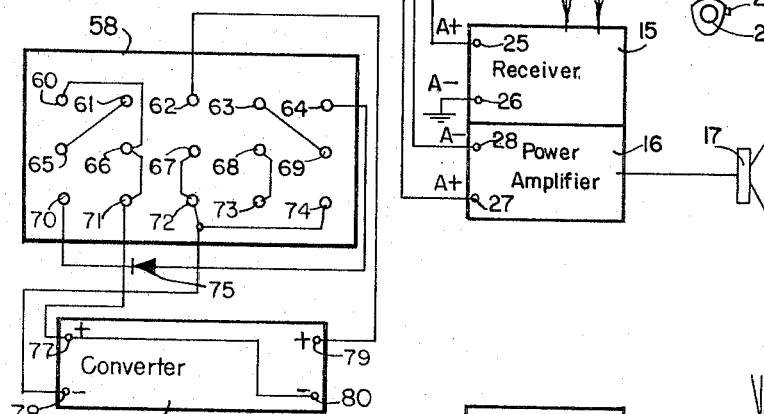
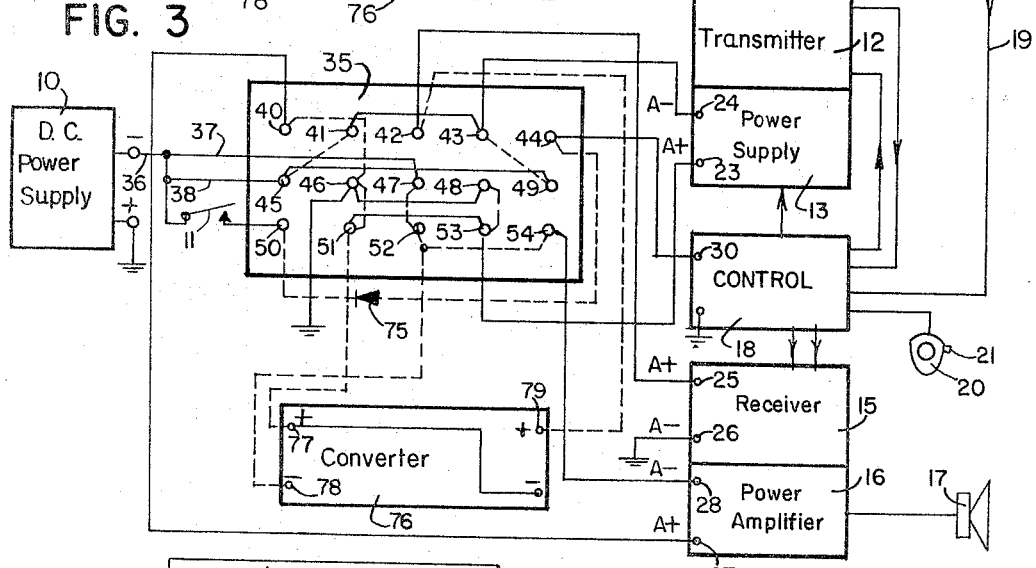
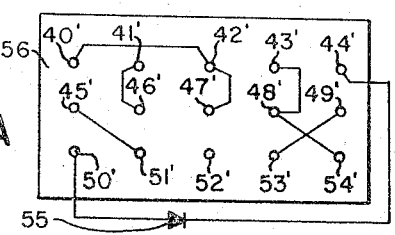
INVENTOR.
George M. Parsons
BY Mueller & Aichele
Attys.

INVENTOR.
George M. Parsons
BY Mueller & Aichele
Attys.

United States Patent Office

3,307,051
Patented Feb. 28, 1967

3,307,051
ENERGIZING SYSTEM
George M. Parsons, Rolling Meadows, Ill., assignor to Motorola, Inc., Franklin Park, Ill., a corporation of Illinois
Filed May 15, 1964, Ser. No. 367,629
8 Claims. (Cl. 307—147)

This invention relates generally to power supply circuits for electronic equipment, and more particularly to a direct current power supply system for energizing equipment from direct current supply means such as a battery which may have either the negative terminal thereof grounded, or the positive terminal grounded.

In many applications, such as for equipment installed in vehicles, it is desired to energize the equipment from a direct current supply such as the battery and generator of a vehicle. Although it is quite common to have the negative terminal of the electrical supply in a vehicle grounded to the vehicle frame, this is not universal and in some vehicles the positive terminal is grounded. Inasmuch as certain electrical components must be connected with a given polarity, the equipment cannot be connected in the same manner in vehicles having positive ground as in vehicles having negative ground.

Direct current power supply systems have been used which have provisions for connection to direct current supplies which have either the negative terminal or the positive terminal grounded. However, these power supplies have been relatively complex and have resulted in substantial increase of the cost of equipment which will always be used in vehicles having electrical systems with the same polarity, such as the negative polarity, grounded. That is, customers desiring equipment for use in vehicles, all of which have direct current supplies with the negative terminal grounded, must pay a premium in order that the equipment can be used by other customers which have vehicles with direct current supplies some of which have the negative terminal grounded and others of which have the positive terminal grounded. Such latter customers prefer to have equipment which can be used in all of their vehicles to facilitate installation of equipment and to make it possible to use spare units in vehicles with power supplies of either type.

It is, therefore, an object of the present invention to provide a direct current power supply system having connections to permit energization from direct current supplies having the negative terminal or the positive terminal grounded, without substantially increasing the cost of the equipment required for vehicles having the negative terminal grounded.

Another object of the invention is to provide a direct current power supply system for equipment having at least one component which must be energized with a given polarity, which system is adapted to be energized from an electrical supply having either the negative terminal or the positive terminal grounded, and which has a single plug-in component which may be plugged into a socket in one position for operation from a direct current supply with the negative polarity grounded and in a second position for operation from a supply with the positive terminal grounded.

A further object of the invention is to provide a simple direct current power supply system suitable for energization from a direct current supply having either the negative or the positive terminal grounded with a simple connector element for connecting electrical equipment to the current supply with the proper polarity and for converting a positive ground supply to a negative ground supply for energization of a component which requires a negative ground supply.

A feature of the invention is the provision of a power supply system for equipment which may be used in vehicles having electrical supplies with the negative or the positive terminal grounded, for energizing electric components at least one of which must be energized by a direct current supply having the negative polarity grounded, including a socket having contacts connected to the direct current supply and to the components and a simple connector cooperating with the socket for completing connections from a direct current supply having the negative terminal grounded.

Another feature of the invention is the provision of a direct current power supply for radio equipment to be installed in a vehicle having a socket connected to a direct current supply which may have either polarity terminal grounded and to the radio equipment, and a connector which may be positioned in the socket in one position when the negative terminal of the supply is grounded and a second position when the positive terminal of the supply is grounded. The connector includes a converter for energizaion from a supply having the positive polarity terminal grounded and provides an output having the negative polarity terminal grounded for energizing at least one component of the radio equipment which must be so energized.

The invention is illustrated in the drawings wherein:

FIG. 1 is a schematic diagram of the direct current power supply system with the current supply and the equipment connected to a socket, and showing the bridging connections required when the current supply has its negative terminal grounded;

FIG. 1A is a schematic diagram of a connector to be used in the system of FIG. 1;

FIG. 2 is a schematic diagram of a connector to be used in the power supply system illustrated in FIG. 1;

FIG. 3 shows the connector of FIG. 2 used in the system of FIG. 1 when the direct current supply has the positive terminal grounded;

Figure 4:
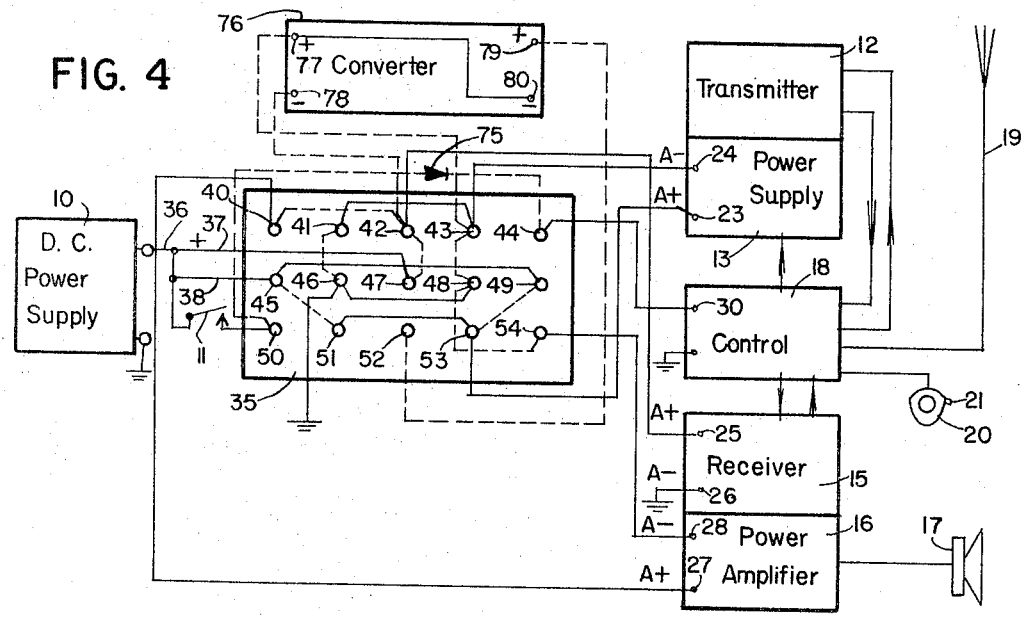
FIG. 4 shows the connector of FIG. 2 used in the system of FIG. 1 when the current supply has the negative terminal grounded.

In practicing the invention there is provided a power supply system for direct current energization of equipment such as radio equipment from a direct current supply such as the battery and generator of a vehicle. The power supply system includes a socket to which the direct current supply and the components to be energized are connected. A connector plugs into the socket for making connections from the direct current supply to the equipment. The socket and the connections thereto are arranged so that they are very simple and do not substantially increase the cost of the equipment. The connector which cooperates with the socket for making connections to the equipment from a direct current supply having the negative terminal grounded is also very simple and inexpensive. The wiring through the socket, however, makes it possible to use a more complicated connector which may engage the socket in open position for providing energization from a direct current supply with the negative terminal grounded, and in a different position for energization from a direct current supply having the positive terminal grounded. Inasmuch as the equipment may have one or more components which must always be energized by a supply having one polarity grounded, the connector includes a converter having an output with the required terminal grounded to supply current to such component or components.

Referring now to the drawing, in FIG. 1 there is illustrated a power supply system for energizing radio transmitter and receiver equipment adapted to be used in a vehicle having a direct current supply. The direct current supply is indicated at 10 and may include the usual battery and generator supply of an automobile. When referring to a generator, an alternator and rectifier unit is also included as this provides a direct current output. The radio equipment includes a transmitter 12 having a power supply 13 for energizing the same, and a receiver 15 having a power amplifier 16 for energizing a loudspeaker 17. A control unit 18 is arranged to connect the transmitter 12 and the receiver 15 selectively to an antenna 19. A microphone 20 having a push-to-talk switch 21 applies audio signals and control signals to the control unit 18, with the audio signals being applied to transmitter 12. The control unit controls operation of the power supply 13 and the receiver 15.

The power supply 13 has terminals 23 and 24 respectively to be energized by a direct current supply, with the terminal 23 providing the positive connection and the terminal 24 providing the negative connection. The receiver 15 has terminals 25 and 26 to which direct current energizing potential is applied, with the terminal 25 being adapted to be connected to a positive potential and the terminal 26 being grounded, as to the chassis of the equipment. As the terminal 26 is permanently grounded, a positive potential must always be applied to terminal 25. The power amplifier 16 of the receiver is separately energized through terminals 27 and 28, with positive potential being applied to terminal 27 and negative potential to terminal 28. The control unit 18 has a terminal 30 to which a potential is applied indicating a particular condition, such as operation of the motor to cause the generator of the vehicle to supply current. This connection may be established through ignition switch 11 of the vehicle, which must always be closed when the engine is operating.

The various terminals of the equipment, as well the ungrounded terminal of the direct current supply are connected to contacts of socket 35. These contacts are numbered 40 to 54 inclusive. Conductor 36 is connected from the "hot" or ungrounded side of the direct current supply 10, and this may be either the positive terminal of a negative grounded supply, or the negative terminal of a positive grounded supply. Conductor 36 is connected through conductor 37 to contact 47 of the socket 35. Conductor 36 is also connected through conductor 38 to contacts 45 and 49 of the socket 35. The two contacts 45 and 49 are connected in parallel to conductor 38 as the connections made therethrough carry large current and this current is divided through the two contacts to reduce the current applied through each individual contact. Contacts 46 and 48 of the socket are connected to ground. The conductor 36 from the power supply is also connected through ignition switch 11 to the contact 50 of the socket 35. It is customary that one side of the ignition switch be connected to the ungrounded side of the direct current supply of the vehicle and therefore this connection is an existing connection in the vehicle. The connection from ignition switch 11 to contact 50 must be provided in the installation of the socket 35.

Terminals 23 and 24 for energizing the power supply 13 for the transmitter are connected respectively to contacts 51 and 53, and contacts 41 and 43 of the socket 35. Terminal 25 for providing a positive potential to the receiver 15 is connected to contact 42 of the socket. Terminals 27 and 28 for providing power to the power amplifier 16 of the receiver are connected respectively to contacts 40 and 54 of the socket 35. Terminal 30 of the control unit 18 is connected to contact 44 of the socket 35. These connections which have been described are permanently wired from the equipment to the socket and the connections from the current supply to the socket and from the socket to ground are made when the equipment is installed in a vehicle. The same connections are used whether the vehicle has a current supply with the negative or the positive terminal grounded.

When the equipment is installed in a vehicle having a direct current supply with the negative terminal grounded, it is necessary to bridge certain of the contacts of socket 35 to establish the required energizing connections. This can be accomplished by a simple connector 56 as shown in FIG. 1A. This connector has contacts 40' to 54' engaging contacts 40 to 54 respectively of socket 35. Connector 56 when inserted in socket 35 provides the connections between the contacts of the socket 35 as shown in dotted lines in FIG. 1. This provides a connection from contact 47 to contact 42 to apply the positive potential of the power supply to the terminal 25 of the receiver. A further connection is made from contact 42 to contact 40 to provide positive potential to terminal 27 of the power amplifier of the receiver. A connection is made between contacts 48 and 54 of the socket to connect the negative terminal 28 of the power amplifier to ground, inasmuch as the power supply has the negative terminal thereof grounded. Parallel connections are made between contacts 45 and 51 and between contacts 49 and 53 to apply positive potential from the battery to the positive terminal 23 of the power supply. As previously stated these contacts provide heavy current and the parallel connections divide the current so that each set of contacts carries only half the total current. Similarly, parallel connections are made between contacts 41 and 46 and between contacts 43 and 48 to complete the connection from ground to the negative terminal 24 of the power supply, since the connection of the negative terminal to ground also carries heavy current.

A connection is established from contact 50 of socket 35 to contact 44 thereof through diode 55 which is provided in the connector 56. This establishes a connection to the terminal 30 of the control unit from the positive potential of the current supply when the ignition switch 11 is closed. The diode 55 is included to prevent the application of a potential of incorrect polarity to the control unit 18. The diode is poled to pass a positive potential from contact 50 to the contact 44 of the socket 35.

With the connections which have been described, the radio equipment is properly energized for operation from a battery having the negative potential terminal grounded. This is the most usual connection of the battery in a vehicle. The socket 35 and the connector for use therewith to make the connections which have been described are relatively simple and represent a minimum additional cost as compared to permanent wiring of the connections. Accordingly, providing the socket and connector does not add substantially to the overall cost of the radio equipment and the energizing connections.

In the event that it is desired to energize the radio equipment from a direct current supply which may have either the negative terminal or the positive terminal grounded, a connector 58 as illustrated in FIG. 2 can be used with the socket 35 in the system of FIG. 1. This connector has 15 contacts numbered 60 to 74 inclusive for engaging the contacts 40 to 54 inclusive of the socket 35 in FIG. 1. The connector and the socket are symmetrical so that the connecor may engage the socket in two positions rotated 180° from each other. Various of the contacts 60 to 74 of the connector 58 are interconnected as shown in FIG. 2, with the contacts 64 and 70 being interconnected through a diode 75 which performs the function of the diode 55 shown in FIG. 1. The connector also includes a converter 76 having a positive input terminal 77 connected to contacts 60, 66 and 71 and a negative terminal 78 connected to contacts 67, 72 and 74. The converter has an output terminal 79 connected to contact 62 of the connector, and a negative output terminal 80 interconnected with the positive input terminal 77 and to contacts 60, 66 and 71 of the connector 58.

FIG. 3 illustrates the connector 58 connected in the system of FIG. 1, with the contacts 60 to 74 inclusive of the connector 58 engaging the contact 40 to 54 respectively of the socket 35. The connections provided by the connector 58 are shown in FIG. 3 by dotted lines in order to make it clear which connections are made in the socket 35 and which connections are made through the connector 58. The connections shown in FIG. 3 provide proper energization of the transmitter and receiver equipment when installed in a vehicle having a direct current supply with the positive terminal thereof grounded.

With these connections, the positive terminal 25 of the receiver 15, which is connected to contact 42 of the socket 35, is connected through the connector 58 to the positive output terminal 79 of the converter 76. The positive input terminal 77 of the converter is connected through contact 66 of the connector 58 to contact 46 of the socket 35 which is grounded. Inasmuch as the direct current supply has its positive terminal grounded, this is a proper connection. The negative input terminal 78 of the converter is connected through contact 67 of the connector 58 to contact 47 of the socket 35, which is connected through conductors 36 and 37 to the negative terminal of the direct current supply. This also is a proper connection for energizing converter 76.

The positive potential terminal 23 of the power supply 13 which is connected to contacts 51 and 53 of the socket 35 is connected to ground by contacts 46 and 48 of the socket 35, through the bridging connections between contacts 66 and 71 and between contacts 68 and 73 of the connector 58. These parallel connections provide connections from the positive terminal of the power supply to ground, and this establishes a connection to the positive terminal of the direct current supply which is also grounded. The negative terminal 24 of the power supply which is connected to contacts 41 and 43 of the socket 35, are connected to contacts 45 and 49 of the socket 35 through bridging connections between contacts 61 and 65 and between contacts 63 and 69 of the connector 58. This provides connection from the negative terminal 24 of the power supply through conductors 38 and 36 to the negative terminal of the direct current supply.

The power amplifier 16 of the receiver is energized with the positive terminal 27 thereof being connected through contact 40 of socket 35, to contact 46 thereof which is grounded, through the connection between contacts 60 and 66 of connector 58. The negative terminal 28 of power amplifier 16 is connected from terminal 54 in the socket 35 to terminal 47 thereof through the connection between contact 67 and contact 74 on the connector 58. This connects the negative terminal 28 of the power amplifier 16 through conductors 37 and 36 to the negative potential of the direct current supply.

The terminal 30 of control unit 18, which is connected to contact 44 of the socket 35, is connected to contact 50 of socket 35 through the connection including diode 75 which extends between contacts 64 and 70 of the connector 58. This establishes a connection from the negative terminal of the direct current supply through conductor 36, ignition switch 11 and diode 75 to terminal 30 of the control unit. The diode 75 is poled properly to complete the negative connection from contact 50 of the socket 35 to the contact 44 thereof. It is pointed out that the diode 75 is shown connected in opposite polarity to the diode 55 shown in FIG. 1, and this is required since in the circuit of FIG. 1 a positive potential is conducted from contact 50 of socket 35 to contact 44 thereof, whereas in FIG. 3 a negative potential is conducted from contact 50 of the socket 35 to contact 44 thereof.

The connections illustrated in FIG. 3 provide the required energizing connections through connector 58 to the radio transmitter and receiver, from a direct current supply having the positive terminal thereof grounded.

The connector 58 of FIG. 2 can also be used in the socket 35 to make the required connections for energizing the radio equipment when installed in an automobile having an electrical supply with the negative terminal thereof grounded. This is accomplished by rotating the connector 58 through 180°. In this case, contact 74 of the connector 58 will be connected to the contact 40 of the socket 35, contact 73 of connector 58 will be connected to contact 41 of socket 35, and so on, with the contact 60 of connector 58 being connected to contact 54 of socket 35.

The connections made through connector 58 for energizing the radio equipment from a current supply having the negative terminal grounded are shown in FIG. 4, wherein the dotted lines show the connections made between the contacts of socket 35 by the connector 58 when it is rotated through 180° with respect to the position shown in FIG. 3. This actually makes the same connections shown in FIG. 1, wherein the equipment is connected to a direct current supply having the negative terminal thereof grounded. Rotation of the connector 58 effectively changes the polarity of the diode 75 so that it conducts a positive potential to the terminal 30 of the control unit 18. Although the connector 58 includes converter 76 and this is shown in FIG. 4, this converter is not used when making connections from a direct current supply with the negative terminal grounded. Accordingly, a connector without a converter can be used if the equipment is to be energized only from a direct current supply with the negative terminal grounded. That is, the simple connections shown in FIG. 1 are all that is required in this case, but the use of connector 58 makes it possible to use exactly the same equipment when installed in vehicles with either terminal of the direct current supply grounded.

Figure 5:
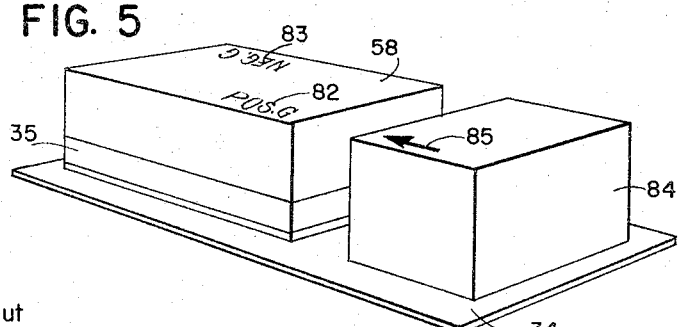
FIG. 5 illustrates the physical structure of the socket and connector and the polarity indicator therefor.

FIG. 5 illustrates an arrangement for indicating the two different positions of the connector 58 with respect to the socket 35. The socket 35 is illustrated as mounted on a chassis 34 which may be the chassis of one of the components of the radio equipment, such as the power supply 13. The connector 58 has designations 82 and 83 thereon, the designation 82 indicating positive ground and the designation 83 indicating negative ground. A component 84 on the chassis 34 may have a marker, such as arrow 85, thereon pointing to the indication on connector 58. The positive ground indication 82 is aligned with the arrow 85 when the connector 58 is positioned on the socket 35 to make the proper connections for use with a direct current supply having the positive terminal thereof grounded. These are the connections shown in FIG. 3. When the connector 58 is removed from the socket 35 and turned through 180°, the indication 83 is aligned with the arrow 85, and clearly shows that the connector 58 is positioned on the socket to make the proper connections from a direct current supply having the negative terminal thereof grounded.

Figure 6:
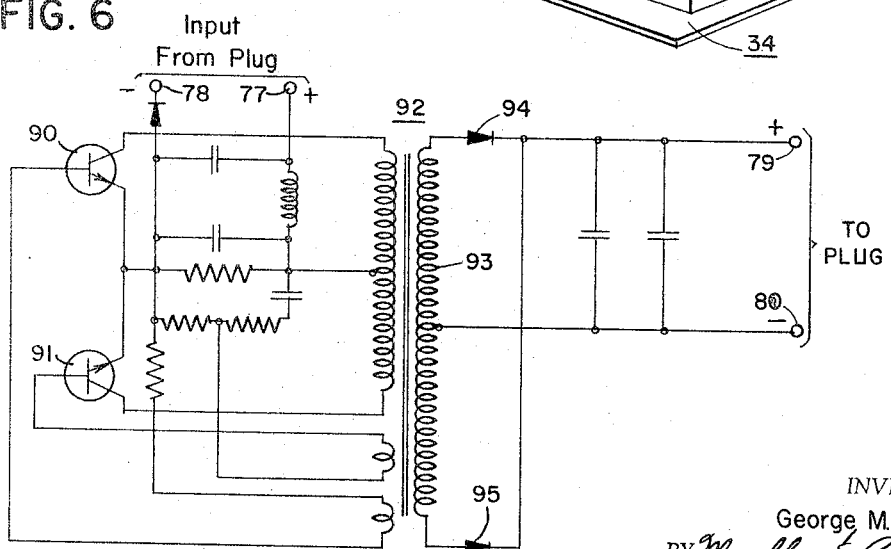
FIG. 6 is a circuit diagram of the converter used in the connector.

The converter 76 provided in the connector 58 may be of a standard construction wherein the output is isolated from the input. FIG. 6 illustrates the circuit of a converter which is suitable for this purpose. Direct current energy is applied to terminals 77 and 78, and a direct current output is provided between terminals 79 and 80. The converter includes transistors 90 and 91 which cooperate with windings of the transformer 92 to form an oscillator circuit. The signal is derived from the output winding 93 of the transformer 92 which is isolated from the oscillator windings. The current in winding 93 is rectified by diode rectifiers 94 and 95 to provide the output direct current. The output terminals are therefore isolated from the input terminals by the transformer 92.

Inasmuch as only certain components must be energized through the converter, the capacity of the converter may be relatively small so that the components may be of small size. This makes it possible to house the converter in the connector 58 without providing an objectionably large removable component. Further, the cost of the converter is small compared to a converter for energizing the entire radio equipment. Also, as the converter introduces losses, the direct connection of a large part of the radio equipment directly to the current supply reduces the losses and the overall power requirement of the radio equipment.

The system of the invention makes it possible to operate the same radio equipment from a current supply with either the negative or positive terminal grounded. However, the cost of the equipment for negative ground operation, which is the largest application for the equipment, is only slightly more than for equipment which is not adaptable to operation from a current supply with either polarity grounded. This does not penalize any user, but makes the equipment suitable for use in various different applications. The equipment is easily converted for operation from a power supply with either polarity grounded and the indicator makes the connections established very evident.

I claim:

1. A system for energizing equipment from direct current supply means having positive and negative terminals one of which is grounded, and wherein the equipment includes at least one component having positive and negative supply terminals which are isolated from ground and a second component having a negative supply terminal connected to ground and a positive supply terminal isolated from ground, said system including in combination, a socket having contacts for connection to the current supply means and to the supply terminals of the equipment, and a connector adapted to engage said socket and having contacts for engaging said contacts of said socket, said connector being engageable with said socket in one position to make proper connections from the current supply means to the supply terminals of the equipment when the negative supply terminal thereof is grounded, said connector being engageable with said socket in a second position to make proper connections from the current supply means to the supply terminals of the equipment when the positive supply terminal thereof is grounded, said connector including converter means energized from the current supply means when said converter is in said second position and having a negative output terminal connected to ground and a positive terminal isolated from ground, said positive output terminal of said converter means being connected to the positive supply terminal of the second component through said contacts of said connector and said socket when said connector is in the second position.

2. A system for energizing equipment from direct current supply means having positive and negative terminals one of which is grounded, and wherein the equipment includes at least one component having positive and negative supply terminals which are isolated from ground and a second component having a negative supply terminal connected to ground and a positive supply terminal isolated from ground, said system including in combination, a socket having contacts for connection to the current supply means and to the supply terminals of the equipment, and a connector adapted to mate with said socket and having contacts for engaging said contacts of said socket, said connector being engageable with said socket in a first position to make proper connections from the supply means to the supply terminals of the equipment when the negative supply terminal thereof is grounded, said connector being engageable with said socket in a second position rotated through 180° with respect to said first position to make proper connections from the supply means to the supply terminals of the equipment when the positive supply terminal thereof is grounded, said connector including converter means energized from the supply means when said connector is in said second position and having a negative output terminal connected to ground and a positive output terminal isolated from ground, said positive output terminal of said converter means being connected to the positive supply terminal of the second component through said contacts of said connector and said socket when said connector is in the second position, said converter being inoperative when said connector is in said first position.

3. A system for energizing equipment from direct current supply means having positive and negative terminals one of which is grounded, and wherein the equipment includes at least one component having positive and negative supply terminals which are isolated from ground and a second component having a negative supply terminal connected to ground and a positive supply terminal isolated from ground, said system including in combination, a socket having contacts for connection to the current supply means and to the supply terminals of the equipment, a connector adapted to mate with said socket and having contacts for engaging said contacts of said socket, said connector being engageable with said socket in a first position to make proper connections from the supply means to the supply terminals of the equipment when the negative supply terminal thereof is grounded, said connector being engageable with said socket in a second position rotated through 180° with respect to said first position to make proper connections from the supply means to the supply terminals of the equipment when the positive supply terminal thereof is grounded, and indicator means including a part on said connector for indicating the polarity of the supply means which is grounded for which the connector is making proper connections, said connector including converter means energized from the supply means when said connector is in said second position and having a negative output terminal connected to ground and a positive output terminal isolated from ground, said positive output terminal of said converter means being connected to the positive supply terminal of the second component through said contacts of said connector and said socket when said connector is in the second position.

4. A system for energizing radio equipment from the direct current supply means of a vehicle having positive and negative terminals one of which is grounded, and wherein the equipment includes a power supply having positive and negative supply terminals which are isolated from ground and a receiver portion having a positive supply terminal isolated from ground, and a chassis forming a grounded negative supply terminal, said system including in combination, a socket having contacts for connection to the current supply means and to the supply terminals of the radio equipment, a connector adapted to mate with said socket and having contacts for engaging said contacts of said socket, said connector being engageable with said socket in a first position to make proper connections from the supply means to the supply terminals of the equipment when the negative supply terminal thereof is grounded, said connector being engageable with said socket in a second position rotated through 180° with respect to said first position to make proper connections from the supply means to the supply terminals of the equipment when the positive supply terminal thereof is grounded, and indicator means including a part on said connector for indicating the position of said connector for making proper connections for use in a vehicle having current supply means with a particular one of the positive and negative terminals thereof grounded, said connector including converter means energized from the supply means when said connector is in said second position and having a negative output terminal connected to ground and a positive output terminal isolatd from ground, said positive output terminal of said converter means being connected to the positive supply terminal of the receiver portion through said contacts of said connector and said socket when said connector is in the second position.

5. A system for energizing equipment from direct current supply means having positive and negative terminals one of which is grounded, and wherein the equipment includes at least one component having positive and negative supply terminals which are isolated from ground and a second component having a negative supply terminal connected to ground and a postive supply terminal isolated from ground, said system including in combination, a socket having contacts symmetrically positioned thereon for connection to the current supply means and to the supply terminals of the equipment, and a connector adapted to mate with said socket and having contacts symmetrically positioned for engaging said contacts of said socket when said connector is in a first position and when said connector is in a second position rotated through 180° with respect to said first position, said connector being engageable with said socket in said first position to make proper connections from the supply means to the supply terminals of the equipment when the negative supply terminal thereof is grounded, said connector being engageable with said socket in said second position to make proper connections from the supply means to the supply terminals of the equipment when the positive supply terminal thereof is grounded, said connector including converter means energized from the supply means when said connector is in said second position and having a negative output terminal connected to ground and a positive output terminal isolated from ground, said positive output terminal of said converter means being connected to the positive supply terminal of the second component through said contacts of said connector and said socket when said connector is in the second position, said converter being inoperative when said connector is in said first position.

6. A system for energizing equipment from direct current supply means having positive and negative terminals one of which is grounded, and wherein the equipment includes at least one component having positive and negative supply terminals which are isolated from ground and a second component having a negative supply terminal connected to ground and a positive supply terminal isolated from ground, said system including in combination, a socket having contacts symmetrically positioned thereon for connection to the current supply means and to the supply terminals of the equipment, and a connector adapted to mate with said socket and having contacts symmetrically positioned for engaging said contacts of said socket when said connector is in a first position and when said connector is in a second position rotated through 180° with respect to said first position, said connector being engageable with said socket in said first position to make proper connections from the supply means to the supply terminals of the equipment when the negative supply terminal thereof is grounded, said connector being engageable with said socket in said second position to make proper connections from the supply means to the supply terminals of the equipment when the positive supply terminal thereof is grounded, said connector including a diode connected between a pair of oppositely positioned contacts thereof, said diode being poled to establish a connection from the positive terminal of the supply means to the equipment when said connector is in said first position and to establish a connection from the negative terminal of the supply means to the equipment when said connector is in said second position.

7. A system for energizing radio equipment from the direct current supply means of a vehicle having positive and negative terminals one of which is grounded, and a switch connected to the terminal which is not grounded, and wherein the equipment includes a power supply portion having positive and negative supply terminals which are isolated from ground, a receiver portion having a positive supply terminal isolated from ground and a grounded chassis forming the negative terminal, and a control portion having a terminal for connection to the switch, said system including in combination, a socket having contacts symmetrically positioned thereon for connection to the current supply means, the switch, and the terminals of the equipment, and a connector adapted to mate with said socket and having contacts symmetrically positioned for engaging said contacts of said socket when said connector is in a first position and when said connector is in a second position rotated through 180° with respect to said first position, said connector being engageable with said socket in said first position to make proper connections from the supply means to the supply terminals of the equipment when the negative supply terminal thereof is grounded, said connector being engageable with said socket in said second position to make proper connections from the supply means to the supply terminals of the equipment when the positive supply terminal thereof is grounded, said connector including converter means energized from the supply means when said connector is in said second position and having a negative output terminal connected to ground and a positive output terminal isolated from ground, said positive output terminal of said converter means being connected to the positive supply terminal of the receiver portion through contacts of said connector and said socket when said connector is in said second position, said converter being inoperative when said connector is in said first position, said connector having a diode connected between a pair of oppositely positioned contacts thereof which engage contacts of said socket to establish a connection from the switch of the vehicle to the terminal of the control portion of the radio equipment, said diode being poled to apply a positive potential to the control portion when said connector is in said first position and to apply a negative potential to the control portion when said connector is in said second position.

8. A system for energizing radio equipment from the direct current supply means of a vehicle having positive and negative terminals one of which is grounded and a switch connected to the terminal which is not grounded, and wherein the equipment includes a power supply portion having positive and negative supply terminals which are isolated from ground, a receiver portion having a positive supply terminal isolated from ground and a grounded chassis forming the negative terminal, and a control portion having a terminal for connection to the switch, said system including in combination, a socket having contacts symmetrically positioned thereon for connection to the current supply means, the switch, and the terminals of the equipment, a connector adapted to mate with said socket and having contacts symmetrically positioned for engaging said contacts of said socket when said connector is in a first position and when said connector is in a second position rotated through 180° with respect to said first position, said connector being engageable with said socket in said first position to make proper connections from the supply means to the supply terminals of the equipment when the negative supply terminal thereof is grounded, said connector being engageable with said socket in said second position to make proper connections from the supply means to the supply terminals of the equipment when the positive supply terminal thereof is grounded, and indicator means including a part on said connector for indicating the position of said connector for making proper connections from current supply means having a particular one of the positive and negative terminals thereof connected to ground, said connector including converter means energized from the supply means when said connector is in said second position and having a negative output terminal connected to ground and a positive output terminal isolated from ground, said positive output terminal of said converter means being connected to the positive supply terminal of the receiver portion through contacts of said connector and said socket when said connector is in said second position, said converter being inoperative when said connector is in said first position, said connector having a diode connected between a pair of oppositely positioned contacts thereof which engage contacts of said socket to establish a connection from the switch of the vehicle and the terminal of the control portion of the radio equipment, said diode being poled to apply a positive potential to the control portion when said connector is in said first position and to apply a negative potential to the control portion when said connector is in said second position.

References Cited by the Examiner

UNITED STATES PATENTS

| | | | |
|---|---|---|---|
| 2,874,317 | 2/1959 | Couse | 310—71 |
| 2,964,620 | 12/1960 | Schulenberg | 325—312 |
| 3,070,737 | 12/1962 | Johnson et al. | 321—2 |
| 3,139,492 | 6/1964 | Cage | 339—31 |

ORIS L. RADER, *Primary Examiner.*

T. B. JOIKE, *Assistant Examiner.*